(12) United States Patent
Hung et al.

(10) Patent No.: US 9,892,338 B2
(45) Date of Patent: Feb. 13, 2018

(54) ENCODING METHOD AND ENCODER FOR CONSTRUCTING AN INITIAL COLOR TABLE

(71) Applicant: Industrial Technology Research Institute, Hsinchu (TW)

(72) Inventors: Chao-Hsiung Hung, Taoyuan (TW); Chun-Lung Lin, Yunlin County (TW); Yao-Jen Chang, Hsinchu (TW); Ching-Chieh Lin, Taipei (TW); Jih-Sheng Tu, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 88 days.

(21) Appl. No.: 14/995,186

(22) Filed: Jan. 13, 2016

(65) Prior Publication Data

US 2016/0217341 A1    Jul. 28, 2016

Related U.S. Application Data

(60) Provisional application No. 62/108,542, filed on Jan. 28, 2015.

(30) Foreign Application Priority Data

Jan. 4, 2016  (TW) .............................. 105100017 A

(51) Int. Cl.
*G06K 9/36*   (2006.01)
*G06K 9/46*   (2006.01)
(Continued)

(52) U.S. Cl.
CPC ......... *G06K 9/4642* (2013.01); *G06K 9/4652* (2013.01); *G06K 9/6223* (2013.01);
(Continued)

(58) Field of Classification Search
USPC ....... 1/1; 345/582, 629; 375/240.02, 240.08, 375/240.12, 240.16; 382/103, 162, 166,
(Continued)

(56) References Cited

U.S. PATENT DOCUMENTS 5,410,418 A * 4/1995 Yonezawa ................ G06K 9/38
                                                    358/464
5,822,452 A * 10/1998 Tarolli .................... H04N 19/00
                                                    345/582

(Continued)

FOREIGN PATENT DOCUMENTS

TW    200945902    11/2009
WO    2014165789   10/2014

OTHER PUBLICATIONS

Pu et al, "AHG10: Simplification of Palette Based Coding", ITU-T SG16 WP3 and ISO/IEC JTC1/SC29/WG11 17th Meeting, JCTVC-Q0047, Mar. 27-Apr. 4, 2014, pp. 1-4.
(Continued)

*Primary Examiner* — Xuemei Chen
(74) *Attorney, Agent, or Firm* — JCIPRNET

(57) ABSTRACT

In an embodiment, an encoding method includes generating a histogram corresponding to all pixels in a coding unit. The encoding method further includes seeking a first color value according to the histogram, wherein a first number of pixels of the first color value in the histogram is greater than or equals to a first threshold. The encoding method further includes seeking a second color value in a first range of the first color value according to the histogram. The encoding method further includes removing one or more pixels of the first color value from the histogram when a second number of pixels of the second color value is greater than or equals to a second threshold. The encoding method further includes adding the first color value into an initial color table when
(Continued)

the second number of pixels is less than the second threshold. An encoder is also provided in the disclosure.

20 Claims, 12 Drawing Sheets

(51) Int. Cl.
| | | |
|---|---|---|
| *G06K 9/62* | (2006.01) | |
| *H04N 1/64* | (2006.01) | |
| *H04N 19/593* | (2014.01) | |
| *H04N 19/93* | (2014.01) | |

(52) U.S. Cl.
CPC .......... *H04N 1/648* (2013.01); *H04N 19/593* (2014.11); *H04N 19/93* (2014.11)

(58) Field of Classification Search
USPC .......................................... 382/168; 707/741
See application file for complete search history.

(56) References Cited

U.S. PATENT DOCUMENTS

| | | | | |
|---|---|---|---|---|
| 6,647,141 | B1* | 11/2003 | Li | G06K 9/4652 |
| | | | | 382/162 |
| 7,162,077 | B2* | 1/2007 | Li | G06T 9/005 |
| | | | | 382/162 |
| 7,162,080 | B2* | 1/2007 | Chui | G06T 9/005 |
| | | | | 382/168 |
| 7,330,195 | B2* | 2/2008 | Li | H04N 1/3871 |
| | | | | 345/629 |
| 8,311,326 | B2* | 11/2012 | Kawashima | H04N 1/4074 |
| | | | | 382/168 |
| 8,429,168 | B1* | 4/2013 | Chechik | G06F 17/30247 |
| | | | | 707/741 |
| 8,615,138 | B2 | 12/2013 | Alakuijala | |
| 8,824,733 | B2* | 9/2014 | Schamp | G06T 7/11 |
| | | | | 382/103 |
| 9,183,643 | B2* | 11/2015 | Matsumura | G06T 9/00 |
| 9,654,806 | B2* | 5/2017 | Zou | H04N 19/80 |
| 2004/0002931 | A1 | 1/2004 | Platt et al. | |
| 2006/0167692 | A1 | 7/2006 | Basu et al. | |
| 2006/0204086 | A1 | 9/2006 | Gargi | |
| 2008/0310755 | A1 | 12/2008 | Jojic et al. | |
| 2013/0114713 | A1 | 5/2013 | Bossen et al. | |
| 2014/0064612 | A1 | 3/2014 | Matsumura et al. | |
| 2014/0301474 | A1 | 10/2014 | Guo et al. | |
| 2014/0301475 | A1 | 10/2014 | Guo et al. | |
| 2015/0010053 | A1 | 1/2015 | Xu et al. | |
| 2015/0016501 | A1 | 1/2015 | Guo et al. | |
| 2015/0146976 | A1 | 5/2015 | Ma et al. | |
| 2015/0186100 | A1* | 7/2015 | Tsai | G06F 3/1454 |
| | | | | 375/240.12 |
| 2015/0262549 | A1 | 9/2015 | Moroney | |
| 2015/0271505 | A1* | 9/2015 | Ma | H04N 19/27 |
| | | | | 375/240.08 |
| 2015/0281703 | A1 | 10/2015 | Zou et al. | |
| 2015/0281728 | A1* | 10/2015 | Karczewicz | H04N 19/93 |
| | | | | 375/240.16 |
| 2016/0100171 | A1* | 4/2016 | Karczewicz | H04N 19/13 |
| | | | | 375/240.02 |
| 2016/0100178 | A1* | 4/2016 | Lin et al. | H04N 19/186 |
| | | | | 382/166 |
| 2016/0323594 | A1* | 11/2016 | Sun | H04N 19/176 |
| 2016/0373745 | A1* | 12/2016 | Joshi | H04N 19/119 |

OTHER PUBLICATIONS

Gisquet et al., "SCCE3: Test C.2—Combination of palette coding tools", ITU-T SG16 WP3 and ISO/IEC JTC1/SC29/WG11 18th meeting, JCTVC-R0086, Jun. 30-Jul. 9, 2014, pp. 1-4.
Guo et al., "RCE4: Test 1. Major-color-based screen content coding", ITU-T SG16 WP3 and ISO/IEC JTC 1/SC 29/WG 11 16th meeting, JCTVC-P0108, Jan. 9-17, 2014, pp. 1-4.
Guo et al., "RCE4: Results of Test 2 on Palette Mode for Screen Content Coding", ITU-T SG16 WP3 and ISO/IEC JTC 1/SC 29/WG 11 16th meeting, JCTVC-P0198, Jan. 9-17, 2014, pp. 1-3.
Guo et al., "Color Palette for Screen Content Coding", IEEE International Conference on Image Processing (ICIP) Conference, Oct. 27-30, 2014, pp. 5556-5560.
Xiu et al., "Palette-based Coding in the Screen Content Coding Extension of the HEVC Standard", Data Compression Conference, Apr. 7-9, 2015, pp. 253-262.
Hung et al, "CE1-Related: Improved Palette Table Generation", 20. JCT-VC Meeting:Geneva; Feb. 10-18, 2015; (Joint Collaborative Team on Video Coding of ITU-T SG 16 WP 3 and ISO/IEC JTC 1/SC 29/WG 11), No. JCTVC-T0087-v6, Feb. 12, 2015, pp. 1-8.
Guo et al., "RCE4: Test 1. Major-color-based screen content coding", 16. JCT-VC Meeting; Jan. 9-17, 2014; San Jose; (Joint Collaborative Team on Video Coding of ITU-T SG 16 WP 3 and ISO/IEC JTC 1/SC 29/WG 11), No. JCTVC-P0108, Jan. 3, 2014, pp. 1-12.
"Search Report of European Counterpart Application", dated May 27, 2016, p. 1-p. 7, in which the listed reference was cited.

* cited by examiner

```
SortingElement *psListHistogram = new SortingElement[uiTotalSize];
SortingElement *psInitial = new SortingElement[uiTotalSize];
UInt uiHisIdx = 0;

for (UInt uiY = 0; uiY < uiHeight; uiY++)
{
    for (UInt uiX = 0; uiX < uiWidth; uiX++)
    {
        uiPos = uiY * uiWidth + uiX;
        sElement.setAll(pSrc[0][uiPos], pSrc[1][uiPos], pSrc[2][uiPos]);

Int i = 0;
        for (i = uiHisIdx - 1; i >= 0; i--)
        {
            if (psListHistogram[i].EqualData(sElement))
            {
                psListHistogram[i].addElement(sElement);
                break;
            }
        }
        if (i == -1)
        {
            psListHistogram[uiHisIdx].copyDataFrom(sElement);
            psListHistogram[uiHisIdx].uiCnt = 1;
            uiHisIdx++;
        }
    }
}
```

FIG. 9

```
UInt uiHisCnt, uiMaxIdx;
UInt uiLimit = ((uiHeight << 2)*iErrorLimit) >> 7;
uiLimit = (uiLimit > (uiHeight >> 1)) ? uiLimit : (uiHeight >> 1);

Bool bOtherPeakExist;
while (true)
{
    uiHisCnt = psListHistogram[0].uiCnt;
    uiMaxIdx = 0;
    for (UInt j = 1; j < uiHisIdx; j++)
    {
        if (psListHistogram[j].uiCnt >= uiHisCnt)
        {
            uiHisCnt = psListHistogram[j].uiCnt;
            uiMaxIdx = j;
        }
    }
    if (uiHisCnt >= uiLimit)
    {
        bOtherPeakExist = false;
        for (UInt j = 0; j < uiHisIdx; j++)
        {
            if (psListHistogram[j].uiCnt >= (uiHisCnt >> 1) && j != uiMaxIdx)
            {
                if
(psListHistogram[uiMaxIdx].almostEqualData(psListHistogram[j], iErrorLimit >> 2))
                {
                    bOtherPeakExist = true;
                }
            }
        }
```

FIG. 10A

```
            if (!bOtherPeakExist)
            {
                psList[uiIdx].copyAllFrom(psListHistogram[uiMaxIdx]);
                psInitial[uiIdx].copyAllFrom(psListHistogram[uiMaxIdx]);
                last = uiIdx;
                uiIdx++;

for (UInt j = 0; j < uiHisIdx; j++)
                {
                    if
(psListHistogram[uiMaxIdx].almostEqualData(psListHistogram[j], iErrorLimit >> 2)
&& j != uiMaxIdx)
                    {
                        psListHistogram[j].ResetElement();
                    }
                }
                psListHistogram[uiMaxIdx].ResetElement();
            }
            else
            {
                break;
            }
        }
```

FIG. 10B

```
UInt uiInitialIdx = uiIdx;
Bool bMatche for (UInt uiY = 0; uiY < uiHeight; uiY++)
{
    for (UInt uiX = 0; uiX < uiWidth; uiX++)
    {
        uiPos = uiY * uiWidth + uiX;
        sElement.setAll(pSrc[0][uiPos], pSrc[1][uiPos], pSrc[2][uiPos]);

bMatched = false;
        for (Int i = 0; i < uiInitialIdx; i++)
        {
            bMatched |= psInitial[i].EqualData(sElement);
        }
```

FIG. 11A

```
          if (!bMatched)
          {
              Int besti = last, bestSAD = (last == -1) ? MAX_UINT :
psList[last].getSAD(sElement);
              if (bestSAD)
              {
                  for (Int i = uiIdx - 1; i >= 0; i--)
                  {
                      UInt sad = psList[i].getSAD(sElement);
                      if (sad < bestSAD)
                      {
                          bestSAD = sad;
                          besti = i;
                          if (!sad) break;
                      }
                  }
              }
              if (besti >= 0 && psList[besti].almostEqualData(sElement,
iErrorLimit))
              {
                  psList[besti].addElement(sElement);
                  last = besti;
              }
              else
              {
                  psList[uiIdx].copyDataFrom(sElement);
                  psList[uiIdx].uiCnt = 1;
                  last = uiIdx;
                  uiIdx++;
              }
          }
       }
```

FIG. 11B

ENCODING METHOD AND ENCODER FOR CONSTRUCTING AN INITIAL COLOR TABLE

CROSS-REFERENCE TO RELATED APPLICATION

This application claims the priority benefits of U.S. provisional application Ser. No. 62/108,542, filed on Jan. 28, 2015, and Taiwan application serial no. 105100017, filed on Jan. 4, 2016. The entirety of each of the above-mentioned patent applications is hereby incorporated by reference herein.

TECHNICAL FIELD

The disclosure relates to an encoding method, a non-transitory computer readable medium thereof, and an encoder.

BACKGROUND

Currently, a network with a wider bandwidth may carry more data. Fashion applications through the network such as network meeting, cloud computing and so on, have been received much attention as the rise of sharing and the transmitting of the screen content. Thus, it becomes important to efficiently transmit screen contents through the network. Screen contents and camera-captured images have different characteristics. Coding the screen contents needs coding tools and schemes different from traditional ones. Palette coding is one of the coding tools and schemes for coding the screen contents, which could provide good compression performances.

A test image for the screen content coding (SCC) usually contains a small number of primary colors. Palette encoding method uses this characteristic to encode the screen contents efficiency. FIG. 1 is a flowchart illustrating a palette encoding method. Referring to FIG. 1, in step S101, the palette encoding method analyzes the primary colors in a coding unit (CU). The CU is composed of pixels and each pixel has its own color values. In step S103, the palette encoding method generates a palette table. In step S105, each pixel of the CU is represented by a corresponding color index on the color index table. Then color indexes forms a color index map. In step S107, the palette table and the color index map are encoded.

FIG. 2 is an example of establishing a color index map by a palette encoding method. Referring to FIG. 2, a CU 201 is composed of 64 pixels having a total of 8 kinds of colors. The palette table may not include all kinds of colors in the CU. Therefore, the colors included in the palette table are primary colors and the colors excluded in the palette table are escape colors. For example, the palette table includes 6 primary colors C0, C1, C2, C4, C5, and C6. Therefore, colors C3 and C7 are classified as escape colors. Usually, there are few pixels that are classified as having escape colors. After the palette table has been generated, the palette encoding method generates a color index map 202 according to the palette table. The color index values from 0 to 5 in the color index map 202 correspond to the colors C0, C1, C2, C4, C5, and C6 in CU 201, respectively. The color index values from 0 to 5 are also referred as primary color index values. The color index value 6 in the color index map 202 corresponds to the two escape colors C3 and C7 in CU 201. The color index value 6 is also referred as an escape color index value. Finally, the palette table and the color index map 202 are encoded, and both the encoded palette table and the encoded color index map are transmitted to the decoder.

The palette table classifies colors having similar color values based on a size of a quantization step. For example, the color values from 1 to 100 are classified into 10 different color groups 1~10, 11~20, 21~30, . . . , and 91~100. The average value of each color group is one of primary colors in the palette table. FIG. 3 is a flowchart of a method illustrating a palette table generation based on the K-means clustering. Referring to FIG. 3, in step S301, all initial color groups are empty. In step S303, a current pixel is selected. Wherein, all pixels in the CU are processed in a raster scan order, which processes pixels of each row from left to right and processes each row from top to bottom, until all pixels in the CU are processed. Then the method classifies all pixels in the CU into different color groups, as described below. In step S305, for each color group, the method calculates a color difference between the color of the current pixel and an average value of the colors of each color group. Each color group has two parameters, wherein one is a number of pixels in the color group and the other is an average value of colors in the color group, and the initial values of both the number of pixels and the average value of colors are zero. In step S307, the method determines whether a minimum value of the color differences between the color of the current pixel and the average value of the colors of the color groups is less than or equal to an error limit based on the size of the quantization step. When the minimum value of the color differences is less than or equal to the error limit (Step S307, Yes), the current pixel is classified into the color group having the minimum value of the color differences, the number of pixels of the color group is added by 1, and the average value of colors of the color group is re-calculated, as shown in step S309. When all the color differences are greater than the error limit (Step S307, No), the current processing pixel forms a new color group, as shown in step S311. For the new color group, the number of pixels is 1 and the average value of colors is the color value of the current pixel. After finishing processing all pixels in the CU, the palette table, according to a predetermined size S, selects S color groups having largest numbers of pixels from all color groups. The S average values of colors of the selected color groups are S primary colors on the palette table. The colors of the pixels in the un-selected color groups are escape colors.

However, some situations may occur when the primary colors are generated by using the K-means clustering. FIG. 4A and FIG. 4B illustrate some of situations occurring on the color groups generated by using the K-means clustering. For a selected color group, the average value of the selected color group may drift as one or more new pixels are included. Thus, the initial color average of the selected color group may be far away from a final color average of the selected color group. For example, referring to FIG. 4A, a selected color group 410 initially has color 411, color 412, color 413, and color 415, and an initial average value of colors is an initial average color 414. With three colors 416~418 being added into the color group 410, the average value of colors of the color group 410 changes from the initial average color 414 to another average color 419, then the average value of colors further changes from the average color 419 to a final average color 420. Therefore, the final average color 420 may be far away from the initial average color 414, and the average value of colors of the selected color group 410 drifts. In addition, a selected color group may include more than one sub groups, and these sub groups may be represented by a primary color such as the average value of colors of the selected color group. Take an example of FIG. 4B, a selected color group 430 includes a sub group 431 and a sub group 432. The sub group 431 and the sub group 432 are represented by the average value of colors of the selected color group 430 (in other words, the sub group 431 and the sub group 432 are represented by an average color 433 of the selected color group 430). Therefore, the color displayed by the sub group 431 and the sub group 432 is the average color 433 that is different from the original colors of the two sub groups 431 and 432.

SUMMARY

The exemplary embodiments of disclosure provide an encoding method, a non-transitory computer readable medium thereof, and an encoder.

An exemplary embodiment of the disclosure relates to an encoding method. The encoding method comprises: generating a histogram corresponding to all pixels in a coding unit; seeking a first color value according to the histogram, wherein a first number of pixels of the first color value in the histogram is greater than or equals to a first threshold; seeking a second color value in a first range of the first color value according to the histogram; removing one or more pixels of the first color value from the histogram when a second number of pixels of the second color value is greater than or equals to a second threshold; and adding the first color value into an initial color table when the second number of pixels is less than the second threshold.

Another exemplary embodiment of the disclosure relates to an encoder. The encoder comprises a generating module, a searching module, a processing module, and a storage module. The generating module generates a histogram corresponding to all pixels in a coding unit. The searching module seeks a first color value according to the histogram, wherein a first number of pixels of the first color value in the histogram is greater than or equals to a first threshold. The searching module further seeks a second color value in a first range of the first color value according to the histogram. The processing module removes one or more pixels of the first color value from the histogram when a second number of pixels of the second color value is greater than or equals to a second threshold. The processing module adds the first color value into an initial color table when the second number of pixels is less than the second threshold. The storage module stores the coding unit, the histogram, and the initial color table.

Yet another exemplary embodiment of the disclosure relates to a non-transitory computer readable medium. The non-transitory computer readable medium stores program instructions for execution by a processor, and the processor executes the program instructions to perform an encoding method comprising: generating a histogram corresponding to all pixels in a coding unit; seeking a first color value according to the histogram, wherein a first number of pixels of the first color value in the histogram is greater than or equals to a first threshold; seeking a second color value in a first range of the first color value according to the histogram; removing one or more pixels of the first color value from the histogram when a second number of pixels of the second color value is greater than or equals to a second threshold; and adding the first color value into an initial color table when the second number of pixels is less than the second threshold.

The foregoing will become better understood from a careful reading of a detailed description provided herein below with appropriate reference to the accompanying drawings.

BRIEF DESCRIPTION OF THE DRAWINGS

FIG. 9 illustrates program codes for generating the histogram according to an exemplary embodiment of the disclosure.

FIG. 10A and FIG. 10B illustrate program codes for generating the initial color table according to an exemplary embodiment of the disclosure.

FIG. 11A and FIG. 11B illustrate program codes for classifying pixels into groups according to an exemplary embodiment of the disclosure.

DETAILED DESCRIPTION OF DISCLOSED EMBODIMENTS

Figure 1:
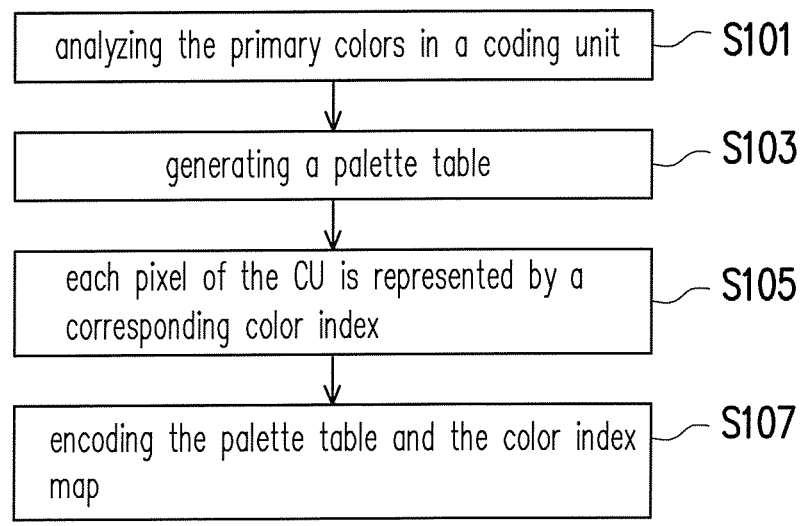
FIG. 1 is a flowchart illustrating a palette encoding method.
Figure 2:
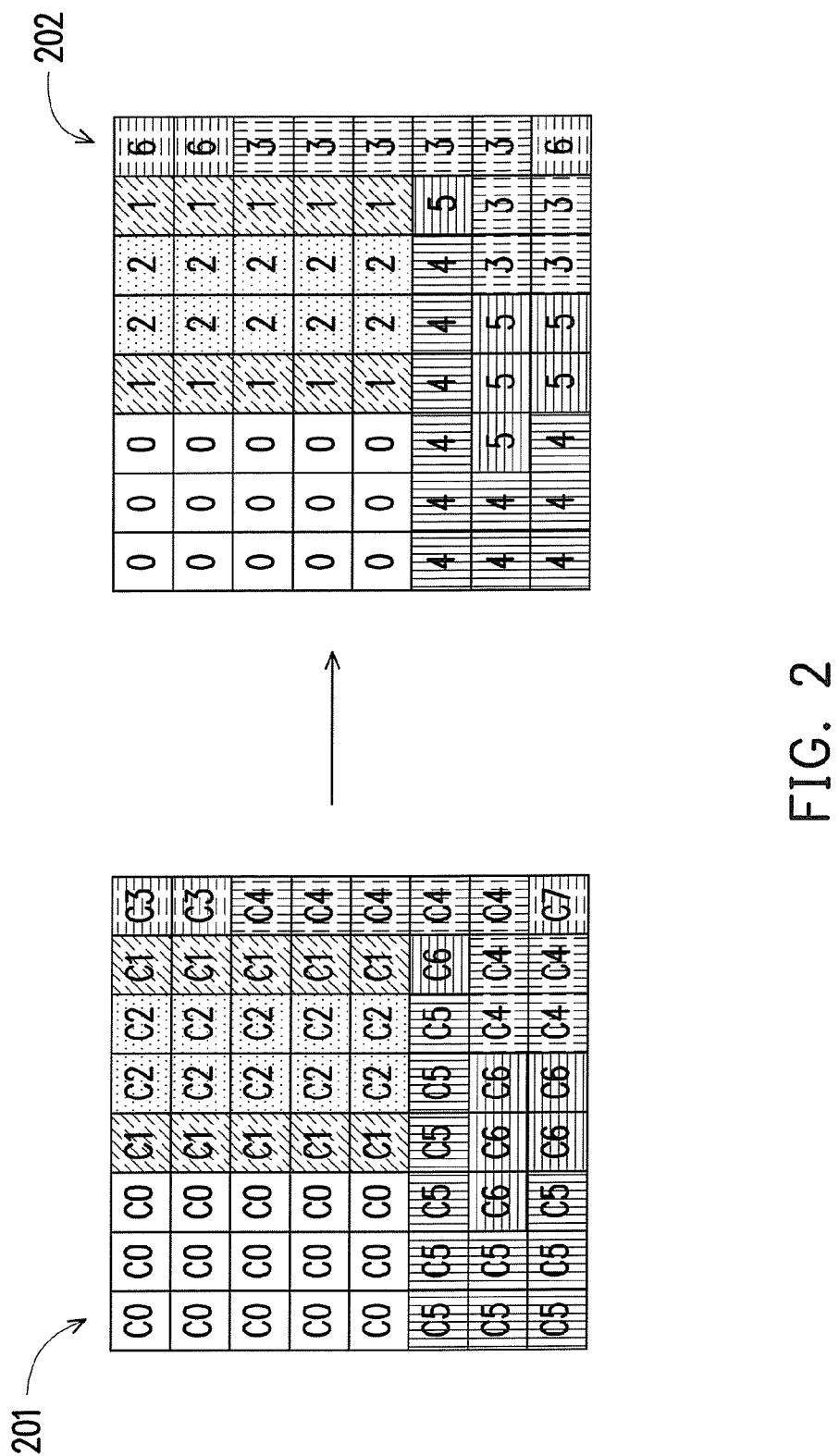
FIG. 2 is an example of establishing a color index map by a palette encoding method.
Figure 3:
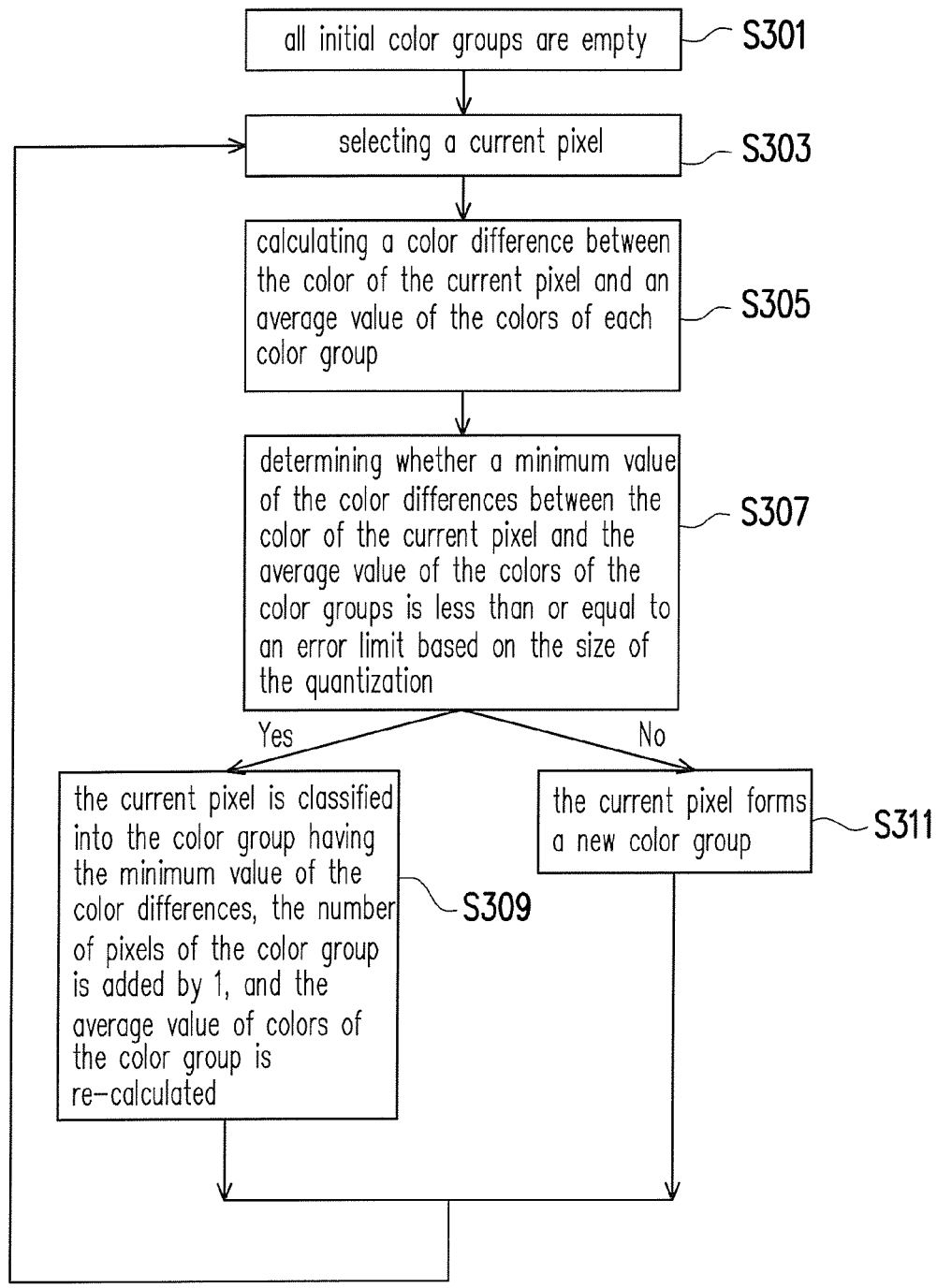
FIG. 3 is a flowchart of a method illustrating a palette table generation based on the K-means clustering.
Figure 4A:
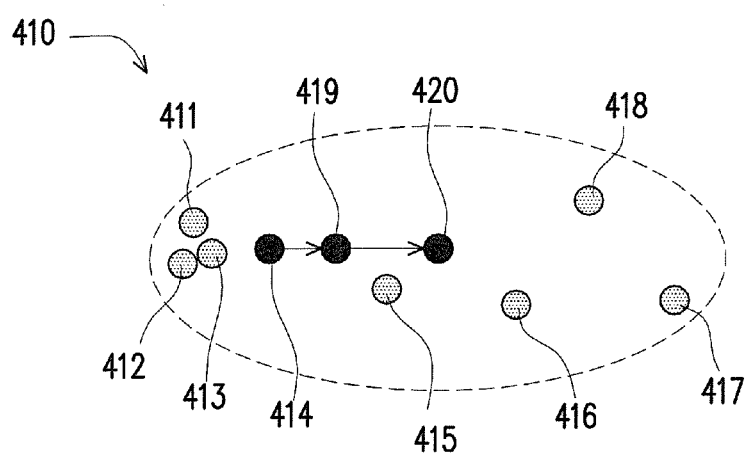
FIG. 4A and FIG. 4B illustrate some of situations occurring on the color groups generated by using the K-means clustering.
Figure 4B:
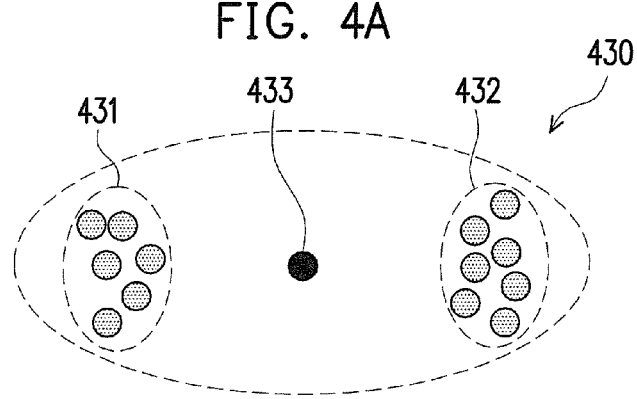

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Exemplary embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

The exemplary embodiments of the disclosure relate to an encoding technology for colors. In the exemplary embodiments, an initial color table is determined according to a histogram. The histogram is generated by a number of pixels in a coding unit and color values of the pixels. A plurality of pixels in the coding unit are classified by using the K-means clustering, wherein a plurality of color values of the plurality of pixels are not in the initial color table. This may make the encoded colors substantially approximate to their original colors.

Figure 5:
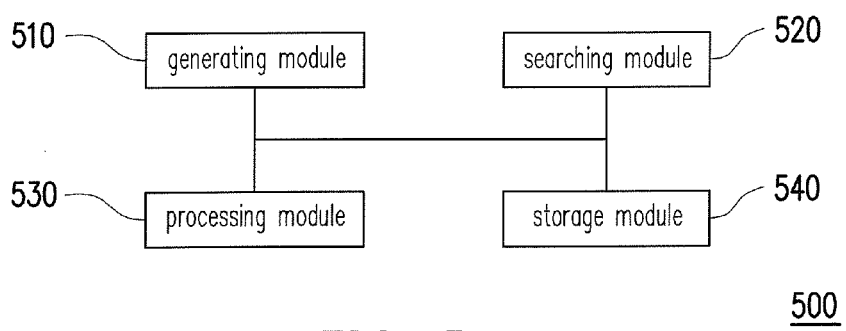
FIG. 5 illustrates a block diagram of an encoder according to an exemplary embodiment of the disclosure.

FIG. 5 illustrates a block diagram of an encoder according to an exemplary embodiment of the disclosure. Referring to FIG. 5, an encoder 500 comprises a generating module 510, a searching module 520, a processing module 530, and a storage module 540. When the generating module 510 obtains a coding unit (CU) of one frame from an input module (not shown), the generating module 510 generates a histogram corresponding to all pixels in the coding unit. In the present exemplary embodiment, the coding unit includes a plurality of pixels arranged in the form of an array. Under an H.265/HEVC standard, a coding tree unit (CTU) is taken as a maximum processing block when the coding unit is encoded, and a size of the CTU is generally set to a 64×64 block. The size of a coding unit may be smaller than or equal to the block size of the CTU. For example, the coding unit is a square rectangle and the size thereof may be a 64×64 block, a 32×32 block, a 16×16 block and an 8×8 block.

After the histogram is generated by the generating module 510, the searching module 520 seeks a first color value according to the histogram, wherein a first number of pixels of the first color value is greater than or equals to a first threshold. The searching module 520 further seeks a second color value in a first range of the first color value according to the histogram. The processing module 530 removes one or more pixels of the first color value from the histogram when a second number of pixels of the second color value is greater than or equals to a second threshold. The processing module 530 adds the first color value into an initial color table when the second number is less than the second threshold. The storage module 540 stores the CU, the histogram, and the initial color table. After the initial color table is generated, the processing module 530 further classifies a plurality of pixels in the coding unit, wherein a plurality of color values of the plurality of pixels are not in the initial color table, and generates a palette table and a color index map corresponding to the CU. The encoding method will be described in detail hereinafter.

The generating module 510, the searching module 520, and the processing module 530 of the disclosure may be implemented by hardware circuits or software or firmware program codes. For example, in an exemplary embodiment of the disclosure, the generating module 510, the searching module 520, and the processing module 530 may be implemented by a generating circuit, a searching circuit, and a processing circuit by hardware circuits. In another exemplary embodiment of the disclosure, the generating module 510, the searching module 520, and the processing module 530 may be implemented by software programs or firmware programs, and the software and/or firmware programs may be executed by a processor. The processor may be, but limited to a device having a logic operating ability such as a central processing unit (CPU), a micro-processor or an embedded controller. The storage module 540 may be, but limited to a volatile memory such as a random access memory (RAM) or a non-volatile memory such as a hard disk drive (HDD), and a solid state drive (SDD). The processing module 530 may be, but limited to a processor that may execute program instructions to perform an encoding method. The program instructions may be stored in at least one non-transitory computer readable medium such as at least one non-volatile memory and/or at least one hard disk in advanced systems.

Figure 6:
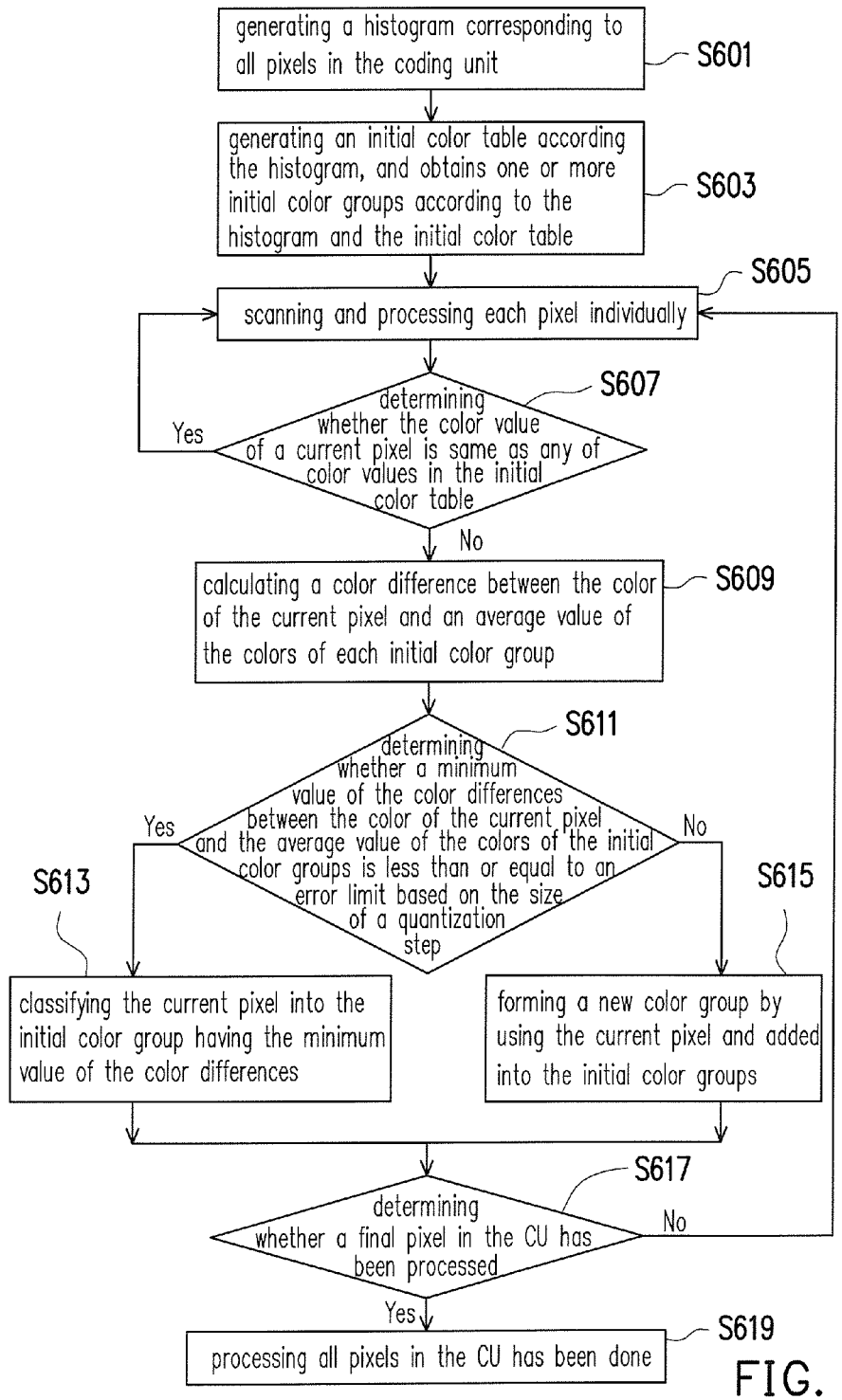
FIG. 6 is a flowchart illustrating an encoding method according to an exemplary embodiment of the disclosure.

FIG. 6 is a flowchart illustrating an encoding method according to an exemplary embodiment of the disclosure. In an exemplary embodiment, the encoding method in FIG. 6 is applicable on the processing module 530 of the encoder 500 shown in FIG. 5. The processing module 530 may execute the program instructions corresponding to the steps included in the encoding method in FIG. 6.

Referring to FIG. 6, in step S601, the encoder 500 generates a histogram corresponding to all pixels in the coding unit. In the histogram, the horizontal axis represents the color values and the vertical axis represents a number of pixels of each color value in the histogram. In step S603, the encoder 500 generates an initial color table according the histogram, and obtains one or more initial color groups according to the histogram and the initial color table. In an embodiment of applying the encoding method on the encoder 500, the encoder 500 may select the color values having a greater number of pixels from the histogram, and generates the initial color table using these selected color values. In addition, the encoder 500 may generate a plurality of initial color groups, wherein the average value of colors and the number of pixels of each generated initial color group may correspond to the color values and the number of pixels selected from the histogram. After the initial color table corresponding to a CU is generated, the initial color table will not be updated in the subsequent steps. The method of generating the initial color table will be described in detail hereinafter.

In step S605, the encoder 500 scans and processes each pixel individually. In an embodiment of applying the encoding method on the encoder 500, the encoder 500 may process all pixels in the CU in a raster scan order, which processes pixels of each row from left to right and processes each row from top to bottom, until all pixels in the CU are processed, and the encoder 500 may determine whether the color value of a current pixel is same as any of color values in the initial color table, as shown in step S607. When the color value of the current pixel is same as one of color values in the initial color table (step S607, Yes), which indicates the current pixel is already in the initial color groups, it does not require to classify the current pixel. In the case, step S605 is perfoiined to continue scanning and processing a next pixel. When the color value of the current pixel is different from all of color values in the initial color table (step S607, No), then the current pixel is classified by using the K-means clustering method.

In step S609, the encoder 500 calculates a color difference between the color of the current pixel and an average value of the colors of each initial color group. Herein, the average value of colors and the number of pixels of each initial color group are the color value and the number of pixels selected from the histogram, respectively. In step S611, the encoder 500 determines whether a minimum value of the color differences between the color of the current pixel and the average value of the colors of the initial color groups is less than or equal to an error limit based on the size of a quantization step. When the minimum value of the color differences is less than or equal to the error limit (Step S611, Yes), the encoder 500 classifies the current pixel into the initial color group having the minimum value of the color differences, as shown in step S613. Also, the number of pixels of the initial color group is added by 1, and the average value of colors of the initial color group is re-calculated. When all color differences are greater than the error limit (step S611, No), the encoder 500 forms a new color group for the current pixel and adds the current pixel into the initial color groups, as shown in step S615. Also, the number of pixels of the new color group is equal to 1, and the average value of colors of the new color group is the color value of the current pixel. After having finished the step S613 or S615, the encoder 500 determines whether a final pixel in the CU has been processed, as shown in step S617. When the final pixel in the CU has not been processed yet (step S617, No), step S605 is performed to continue scanning and processing the next pixel. When the final pixel in the CU has been processed (step S617, Yes), the encoder 500 has been done processing all pixels in the CU, as shown in step 619.

Once the initial color table is established, it will not be updated after the establishment. However, the number of the initial color groups, the number of pixels of each initial color group, and the average value of colors of each initial color group may be changed as a pixel is added into an initial color group or a new color group is formed.

Figure 7:
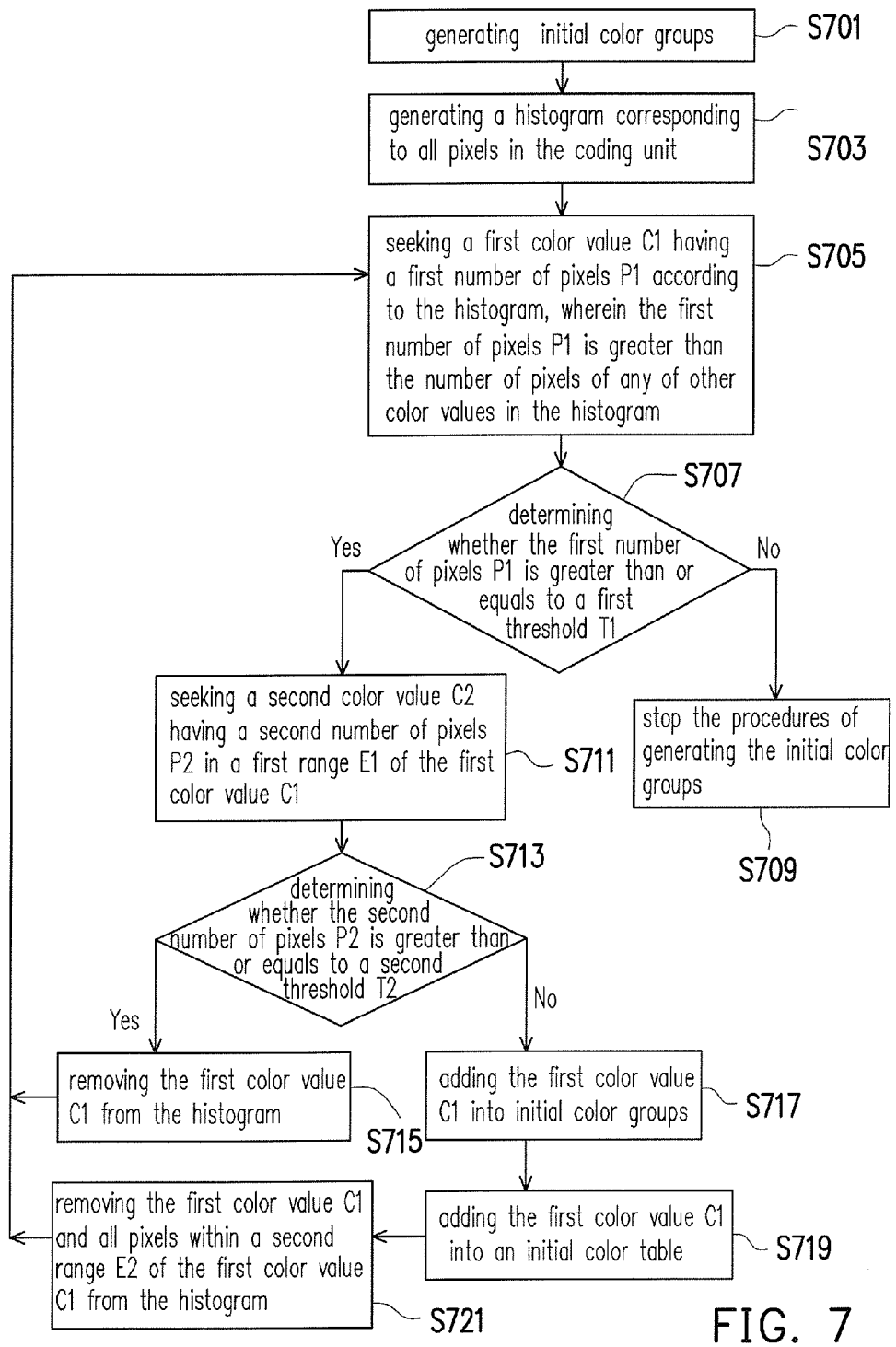
FIG. 7 is a flowchart of generating an initial color table according to an exemplary embodiment of the disclosure.
Figure 8:
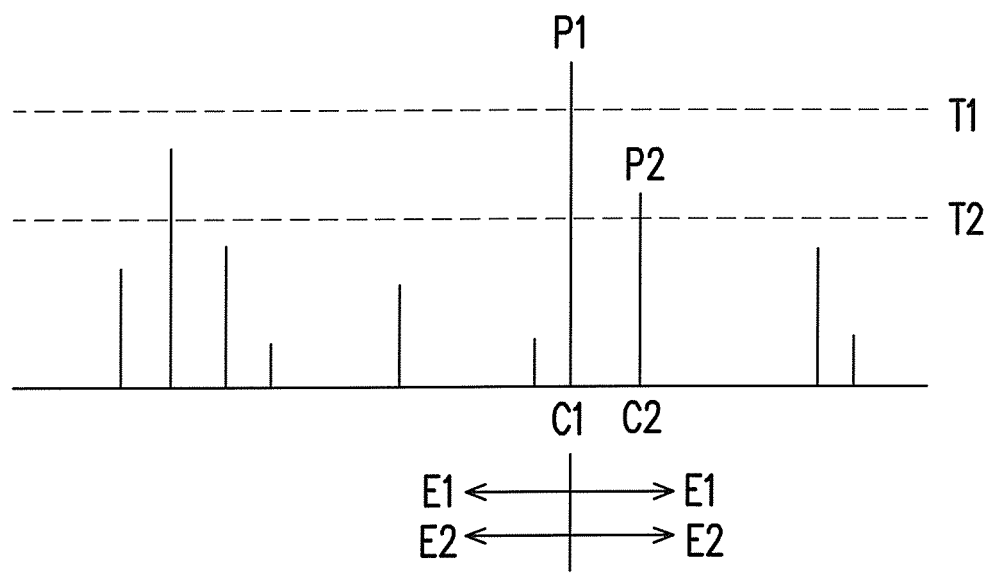
FIG. 8 is a schematic diagram of a histogram generated by all pixels in the coding unit according to an exemplary embodiment of the disclosure.

FIG. 7 is a flowchart of generating an initial color table according to an exemplary embodiment of the disclosure. FIG. 8 is a schematic diagram of a histogram generated by all pixels in the coding unit according to an exemplary embodiment of the disclosure.

Referring to FIG. 7 and FIG. 8, in an embodiment of applying the generating an initial color table on the encoder 500, the encoder 500 starts generating the initial color groups, as shown in step S701. In step S703, the encoder 500 generates a histogram corresponding to all pixels in the coding unit, wherein the horizontal axis represents the color values in the histogram and the vertical axis represents the number of pixels of each color value in the histogram.

In step S705, the encoder 500 seeks a first color value C1 having a first number of pixels P1 according to the histogram, wherein the first number of pixels P1 is greater than the number of pixels of any of other color values in the histogram.

In step S707, the encoder 500 determines whether the first number of pixels P1 is greater than or equals to a first threshold T1, wherein the first threshold T1 is a maximum value of two values, and one value equals to a width W of the CU multiplied by an error limit E and then divided by 32, and the other value equals to the width W divided by 2 (that is, T1=max(W×E/32, W/2)), wherein the error limit E is determined by the size of a quantization step. When the first number of pixels P1 is less than the first threshold T1, the encoder 500 stops the procedures of generating the initial color groups, as shown in step S709.

When the first number of pixels P1 is greater than or equals to the first threshold T1 (step S707, Yes), in step S711, the encoder 500 seeks a second color value C2 having a second number of pixels P2 in a first range E1 of the first color value C1, wherein the second color value C2 is within the first range E1 of the first color value C1 and the second color value C2 is the color value having the maximum number of pixels excluding the first color value C1. The first range E1 is a range that has a central value of the first color value C1 and a deviation D equal to the error limit E divided by 4 (that is, the first range E1=(C1−D, C1+D), where D=E/4).

In step S713, the encoder 500 determines whether the second number of pixels P2 is greater than or equals to a second threshold T2, wherein the second threshold T2 equals to the first number of pixels P1 divided by 2 (i.e., T1=P1/2). When the second amount of pixels P2 is greater than or equals to the second threshold T2 (step S713, Yes), the encoder 500 removes the first color value C1 from the histogram (step S715), which indicates that all pixels of the first color value C1 are removed from the histogram. Then step S705 is performed to continue seeking a color value having the maximum number of pixels.

When the second number of pixels P2 is less than the second threshold T2 (step S713, No), the encoder 500 adds the first color value C1 into initial color groups (step S717). In step S719, the encoder 500 adds the first color value C1 into an initial color table. Then, the encoder 500 removes the first color value C1 and all pixels within a second range E2 of the first color value C1 from the histogram, as shown in step S721. The second range E2 is a range that has a central value of the first color value C1 and a deviation D equal to the error limit E divided by 4 (that is, the second range E2=(C1−D, C1+D), where D=E/4). Finally, step S705 is performed to continue seeking the color value having the maximum number of pixels.

The first threshold T1 is associated with the width W of the CU and the error limit E, therefore, the first threshold T1 is unchanged during the processing of a same CU. In addition, the second threshold T2 equals to the first number of pixels P1 divided by 2, therefore, the second threshold T2 is changed during the processing of a same CU, as the first number of pixels P1 of the first color value C1 is changed.

FIG. 9 illustrates program codes for generating the histogram according to an exemplary embodiment of the disclosure. The program codes in the exemplary embodiment of FIG. 9 may be executed by the encoder 500. Accordingly, the encoder 500 scans all pixels in the CU and generates a histogram. In an embodiment, the encoder 500 obtains the color value of each pixel in the CU one by one, and compares each color value with the color values of pixels in the histogram. When the encoder 500 finds the corresponding color value in the histogram, the number of pixels of the color value is added by 1. When no corresponding color value in the histogram can be found by the encoder 500, the color value of the pixel is added into the histogram and the number of pixel of the added color value is set to 1.

FIG. 10A and FIG. 10B illustrate program codes for generating the initial color table according to an exemplary embodiment of the disclosure. Referring to FIG. 10A and FIG. 10B, the first threshold T1 and the second threshold T2 respectively correspond to the parameters "uiLimit" and "uiHisCnt>>1" (that is, uiHisCnt divided by 2) in the program codes. The first range E1 and the second range E2 correspond to the parameter "iErrorLimit>>2" (that is, iErrorLimit divided by 2) in the program codes. The first amount of pixels P1 corresponds to the parameter "uiHisCnt" in the program codes. First, the process according to the program codes seeks the color value having the maximum number of pixels, wherein the maximum number of pixels is the first number of pixels P1 and the corresponding color value is the first color value C1. Then, the process determines whether or not the first number of pixels P1 is greater than or equals to a first threshold T1. When the process determines P1 is greater than or equals to T1, the process further seeks the second color value C2 having the second number of pixels P2 in the first range E1 of the first color value C1, wherein the second number of pixels P2 is greater than or equals to the second threshold T2. When the second color value C2 is found, the parameter "bOtherPeakExist" (the parameter "bOtherPeakExist" indicates whether or not the second largest number of pixels of the color value is found) is set to "true" in the program codes. Also, the first color value C1 is removed from the histogram. When the second color value C2 is not found, the parameter "bOtherPeakExist" is same as a default value "false" in the program codes. Also, the first color value C1 is copied to the initial color groups and the initial color table, and all pixels within a second range E2 of the first color value C1 are removed from the histogram. Furthermore, when the process finds the first number of pixels P1 is less than the first threshold T1 at the beginning, the process stops searching the histogram.

FIG. 11A and FIG. 11B illustrate program codes for classifying pixels into groups according to an exemplary embodiment of the disclosure.

Referring to FIG. 11A and FIG. 11B, the process according to the program codes compares the color value of the current pixel with all color values in the initial color table. When the color value of the current pixel is already in the initial color table, the process does not classify the current pixel. When the color value of the current pixel is not in the initial color table, the process classifies the current pixel by using the K-means clustering method. The K-means clustering method calculates the color difference between the color of the current pixel and an average value of the colors of each initial color group, and determines whether or not a minimum value of the color differences between the color of the current pixel and the average value of the colors of the initial color groups is less than or equal to an error limit based on the size of a quantization step. When the minimum value of the color differences is less than or equal to the error limit, the process classifies the current pixel into the initial color group having the minimum value of the color differences. Also, the number of pixels of the initial color group is added by 1, and the average value of colors of the initial color group is re-calculated. When all the color differences are greater than the error limit, a new color group is formed by using the current pixel, and is added into the initial color groups. Also, the number of pixels of the new color group is equal to 1, and the average value of colors of the new color group is the color value of the current pixel.

the conventional JCT-VT method, and the encoded colors substantially approximates to the original color. The encoding time generally takes about few hours, therefore, the encoding time according to the embodiments of the disclosure is reduced by 1% to 3%, and may save about an hour. While the decoding time generally takes about few seconds, and it is easy to be affected by the computing power of the computer. Therefore, an increment of 1% of the decoding time is still within the error range.

The method in accordance with the exemplary embodiment of the disclosure may be implemented by utilizing a computer readable medium, which may be any kind of recording device that stores computer-system readable data, such as ROM, RAM, CD-ROM, magnetic tape, floppy disks, optical storage devices including one or more data signals embodied in a carrier wave (for example, a transmission over the Internet), and so on.

In summary, the encoding method and the encoder according to the disclosed exemplary embodiments generate a histogram corresponding to a coding unit, seek the color values having much number of pixels by using the histogram, and add the color values into an initial color values. When the color value of a pixel in the CU is already in the initial color table, the pixel is not classified. When the color value of the pixel in the CU is not in the initial color table, the pixel is classified by using the K-means clustering. According to the encoding method and the encoder, the classified color values of pixels substantially approximate to the original colors. Also, the encoding time of the disclosed encoding method or the encoder is less than the known method, and the encoding of the disclosed encoding method or the encoder has a higher compression ratio than that of the known method.

TABLE 1

|  | All Intra | | | Random Access | | | Low delay B | | |
| --- | --- | --- | --- | --- | --- | --- | --- | --- | --- |
|  | G/Y | B/U | R/V | G/Y | B/U | R/V | G/Y | B/U | R/V |
| RGB, text & graphics with motion, 1080p & 720p | −0.2% | −0.2% | −0.2% | −0.5% | −0.4% | −0.4% | −0.1% | −0.1% | −0.1% |
| RGB, mixed content, 1440p & 1080p | −0.2% | −0.2% | −0.2% | −0.3% | −0.4% | −0.4% | −0.3% | −0.2% | −0.3% |
| RGB, Animation, 720p | 0.0% | 0.0% | 0.0% | 0.0% | 0.1% | 0.0% | 0.0% | 0.1% | −0.1% |
| RGB, camera captured, 1080p | 0.0% | 0.0% | 0.0% | 0.0% | 0.0% | 0.0% | 0.0% | 0.0% | 0.1% |
| YUV, text & graphics with motion, 1080p & 720p | −0.5% | −0.3% | −0.3% | −0.7% | −0.8% | −0.9% | −0.2% | −0.3% | −0.4% |
| YUV, mixed content, 1440p & 1080p | −0.5% | −0.4% | −0.1% | −0.6% | −0.9% | −0.7% | −0.8% | −0.7% | −0.6% |
| YUV, Animation, 720p | 0.0% | 0.0% | −0.1% | 0.0% | 0.0% | 0.1% | 0.0% | 0.0% | −0.1% |
| YUV, camera captured, 1080p | 0.0% | 0.0% | 0.0% | 0.0% | 0.0% | 0.0% | 0.0% | 0.2% | 0.0% |
| Enc Time[%] | | 98% | | | 97% | | | 99% | |
| Dec Time[%] | | 98% | | | 101% | | | 101% | |

Table 1 compares the encoding method according to an exemplary embodiment of the disclosure with the conventional JCT-VT method, under three different test conditions. In Table 1, the negative values mean improved coding performance. For the negative values, the larger absolute values mean better coding performance. The disclosure method provides better coding performance. Referring to Table 1, the encoding times according to the encoding method of the disclosure are, respectively, 2%, 3%, and 1% faster than the encoding times of the conventional JCT-VT method, under the three different test conditions. The decoding times of the disclosure are, respectively, 2% faster, 1% slower, and 1% slower than the decoding times of the known JCT-VT method, under the three different test conditions. Therefore, the encoding time according to the encoding method of the disclosure may save by 1% to 3% in the condition of having similar encoding time compared with It will be apparent to those skilled in the art that various modifications and variations can be made to the disclosure. It is intended that the specification and examples be considered as exemplary embodiments only, with a scope of the disclosure being indicated by the following claims and their equivalents.

What is claimed is:
1. An encoding method, comprising:
   generating a histogram corresponding to all pixels in a coding unit;
   seeking a first color value according to the histogram, wherein a first number of pixels of the first color value in the histogram is greater than or equals to a first threshold;
   seeking a second color value in a first range of the first color value according to the histogram, wherein the second color value is a color value having a maximum number of pixels excluding the first color value in the first range;

removing one or more pixels of the first color value from the histogram when a second number of pixels of the second color value is greater than or equals to a second threshold; and adding the first color value into an initial color table when the second number of pixels is less than the second threshold.

2. The encoding method as claimed in claim 1, further comprising classifying a plurality of pixels in the coding unit by using a K-means clustering method, wherein a plurality of color values of the plurality of pixels are not in the initial color table.

3. The encoding method as claimed in claim 1, wherein the step of adding the first color value into the initial color table further comprises:

removing all pixels within a second range of the first color value from the histogram.

4. The encoding method as claimed in claim 3, wherein the second range is a range that has a central value of the first color value and a deviation equal to an error limit divided by 4.

5. The encoding method as claimed in claim 1, wherein a horizontal axis and a vertical axis in the histogram represent a color value and a number of pixels of the color value, respectively.

6. The encoding method as claimed in claim 1, wherein the first threshold is a maximum of two values, and one value equals to a width of the coding unit multiplied by an error limit and then divided by 32, the other value equals to the width of the coding unit divided by 2.

7. The encoding method as claimed in claim 6, wherein the error limit is determined by a size of a quantization step.

8. The encoding method as claimed in claim 6, wherein the first range is a range that has a central value of the first color value and a deviation equal to the error limit divided by 4.

9. The encoding method as claimed in claim 1, wherein the second threshold is a value of the first number of pixels divided by 2.

10. An encoder, comprising:

a processor, generating a histogram corresponding to all pixels in a coding unit;

seeking a first color value according to the histogram, wherein a first number of pixels of the first color value in the histogram is greater than or equals to a first threshold, wherein the processor seeks a second color value in a first range of the first color value according to the histogram, wherein the second color value is a color value having a maximum number of pixels excluding the first color value in the first range; and removing one or more pixels of the first color value from the histogram when a second number of pixels of the second color value is greater than or equals to a second threshold, wherein the processor adds the first color value into an initial color table when the second number of pixels is less than the second threshold; and a memory, storing the coding unit, the histogram, and the initial color table.

11. The encoder as claimed in claim 10, wherein the processor further classifies a plurality of pixels in the coding unit by using a K-means clustering method, wherein a plurality of color values of the plurality of pixels are not in the initial color table.

12. The encoder as claimed in claim 10, wherein the processor removes all pixels within a second range of the first color value from the histogram, after the first color value is added into the initial color table.

13. The encoder as claimed in claim 12, wherein the second range is a range that has a central value of the first color value and a deviation equal to an error limit divided by 4.

14. The encoder as claimed in claim 10, wherein a horizontal axis and a vertical axis in the histogram represent a color value and a number of pixels having the color value, respectively.

15. The encoder as claimed in claim 10, wherein the first threshold is a maximum of two values, and one value equals to a width of the coding unit multiplied by an error limit and then divided by 32, the other value equals to the width of the coding unit divided by 2.

16. The encoder as claimed in claim 15, wherein the error limit is determined by a size of a quantization step.

17. The encoder as claimed in claim 15, wherein the first range is a range that has a central value of the first color value and a deviation equal to the error limit divided by 4.

18. The encoder as claimed in claim 10, wherein the second threshold is a value of the first number of pixels divided by 2.

19. A non-transitory computer readable medium, storing a plurality of program instructions for execution by a processor, the processor executes the program instructions to perform an encoding method, the method comprising:

generating a histogram corresponding to all pixels in a coding unit;

seeking a first color value according to the histogram, wherein a first number of pixels of the first color value in the histogram is greater than or equals to a first threshold;

seeking a second color value in a first range of the first color value according to the histogram, wherein the second color value is a color value having a maximum number of pixels excluding the first color value in the first range;

removing one or more pixels of the first color value from the histogram when a second number of pixels of the second color value is greater than or equals to a second threshold; and adding the first color value into an initial color table when the second number of pixels is less than the second threshold.

20. The non-transitory computer readable medium as claimed in claim 19, wherein the step of adding the first color value into the initial color table further comprises:

removing all pixels within a second range of the first color value from the histogram.

* * * * *